US011568329B2

(12) United States Patent
Kawamoto et al.

(10) Patent No.: US 11,568,329 B2
(45) Date of Patent: Jan. 31, 2023

(54) INFORMATION PROCESSING METHOD AND INFORMATION PROCESSING SYSTEM

(71) Applicant: Panasonic Intellectual Property Management Co., Ltd., Osaka (JP)

(72) Inventors: Hirokazu Kawamoto, Osaka (JP); Eiichi Naito, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/995,081

(22) Filed: Aug. 17, 2020

(65) Prior Publication Data

US 2020/0380429 A1 Dec. 3, 2020

Related U.S. Application Data

(63) Continuation of application No. PCT/JP2019/035428, filed on Sep. 10, 2019.

(30) Foreign Application Priority Data

Nov. 19, 2018 (JP) .............................. JP2018-216672

(51) Int. Cl.
G06Q 10/02 (2012.01)
(52) U.S. Cl.
CPC .................................... G06Q 10/02 (2013.01)
(58) Field of Classification Search
CPC ..................................................... G06Q 10/02
USPC ............................................................. 705/5
See application file for complete search history.

(56) References Cited

U.S. PATENT DOCUMENTS

| 2011/0193522 | A1 | 8/2011 | Uesugi | |
|---|---|---|---|---|
| 2012/0290506 | A1* | 11/2012 | Muramatsu | ........ G01C 21/3679 701/400 |
| 2014/0129139 | A1* | 5/2014 | Ellison | ............... G01C 21/3469 701/533 |
| 2015/0158393 | A1* | 6/2015 | Kawano | ................. G06Q 10/04 320/109 |

(Continued)

FOREIGN PATENT DOCUMENTS

| JP | 2010-231258 | 10/2010 |
|---|---|---|
| JP | 2011-164771 | 8/2011 |

(Continued)

OTHER PUBLICATIONS

"Reserving charging strategy for electric vehicles based on combined model of road-charging station-electric vehicle" Published by IEEE (Year: 2016).*

(Continued)

Primary Examiner — Zeina Elchanti
(74) Attorney, Agent, or Firm — Wenderoth, Lind & Ponack, L.L.P.

(57) ABSTRACT

A computer-implemented information processing method includes: obtaining a plan including at least locations to which moving object is expected to travel and stay at; setting, on the basis of the locations included in the plan, a candidate charging location at which the battery of the moving object is chargeable; obtaining the reservation status of a charging station associated with the candidate charging location; and arranging reservation details according to the reservation status of the charging station.

11 Claims, 12 Drawing Sheets

(56) References Cited

U.S. PATENT DOCUMENTS

| | | | |
|---|---|---|---|
| 2015/0286965 A1* | 10/2015 | Amano | B60L 53/68 |
| | | | 705/5 |
| 2016/0297316 A1 | 10/2016 | Penilla et al. | |
| 2016/0364658 A1* | 12/2016 | Khoo | B60L 53/31 |
| 2017/0176195 A1* | 6/2017 | Rajagopalan | B60L 58/12 |
| 2018/0065494 A1* | 3/2018 | Mastrandrea | B60L 53/50 |
| 2018/0143035 A1* | 5/2018 | Ricci | G06Q 30/0266 |
| 2019/0016384 A1* | 1/2019 | Carlson | B60W 30/00 |
| 2019/0210468 A1* | 7/2019 | Wittl | H02J 7/00714 |
| 2019/0275893 A1* | 9/2019 | Sham | B60L 53/65 |
| 2020/0380429 A1* | 12/2020 | Kawamoto | G06Q 50/10 |

FOREIGN PATENT DOCUMENTS

| | | |
|---|---|---|
| JP | 2012-208686 | 10/2012 |
| JP | 2015-138501 | 7/2015 |

OTHER PUBLICATIONS

International Search Report dated Oct. 29, 2019 in International (PCT) Application No. PCT/JP2019/035428.
Extended European Search Report dated Nov. 17, 2021 for European Patent Application No. 19887965.2.

* cited by examiner

FIG. 3

| USER ID | USER NAME | USER ADDRESS | USER TERMINAL TYPE | USER EMAIL ADDRESS |
|---|---|---|---|---|
| ZZZ | YYY | XXX | WWW | VVV@VVVV |
| ⋮ | ⋮ | ⋮ | ⋮ | ⋮ |

| USER ID | ARRIVAL TIME | DEPARTURE TIME | TASK | NAME OF TASK PERFORMING PLACE | ADDRESS OF TASK PERFORMING PLACE |
|---|---|---|---|---|---|
| ZZZ | UU:UU | TT:TT | DELIVERY OF PACKAGE S | RRR | QQQ |
| ⋮ | ⋮ | ⋮ | ⋮ | ⋮ | ⋮ |

| USER ID | ARRIVAL TIME | DEPARTURE TIME | TASK | NAME OF TASK PERFORMING PLACE | ADDRESS OF TASK PERFORMING PLACE |
|---|---|---|---|---|---|
| TRACK01 | 10:20 | 10:23 | DELIVERY OF PACKAGE P1 | DETACHED HOUSE A | AA-SHI, AAA-CHO |
| TRACK01 | 10:50 | 10:53 | DELIVERY OF PACKAGE P2 | APARTMENT BUILDING B | AA-SHI, BBB-CHO |
| TRACK01 | 10:55 | 10:58 | DELIVERY OF PACKAGE P3 | APARTMENT BUILDING B | AA-SHI, BBB-CHO |
| TRACK01 | 11:00 | 11:03 | DELIVERY OF PACKAGE P4 | APARTMENT BUILDING B | AA-SHI, BBB-CHO |
| TRACK01 | 11:50 | 11:53 | DELIVERY OF PACKAGE P5 | DETACHED HOUSE C | AA-SHI, CCC-CHO |
| ⋮ | ⋮ | ⋮ | ⋮ | ⋮ | ⋮ |

FIG. 6

| USER ID | ARRIVAL TIME | DEPARTURE TIME | TASK | NAME OF TASK PERFORMING PLACE | ADDRESS OF TASK PERFORMING PLACE |
|---|---|---|---|---|---|
| CAR02 | 9:50 | 11:10 | BUSINESS MEETING 1 | SALES BRANCH D | AA-SHI, DDD-CHO |
| CAR02 | 11:30 | 12:30 | REST | RESTAURANT E | AA-SHI, EEE-CHO |
| CAR02 | 12:45 | 14:15 | DEAL CLOSING 2 | COMPANY F | AA-SHI, EEE-CHO |
| ⋮ | ⋮ | ⋮ | ⋮ | ⋮ | ⋮ |

FIG. 7

| CHARGING STATION ID | NAME OF INSTALLATION PLACE | ADDRESS OF INSTALLATION PLACE | NUMBER OF CHARGING PORTS | CHARGING STANDARD |
|---|---|---|---|---|
| PPP | OOO | NNN | MMM | LLL |
| ⋮ | ⋮ | ⋮ | ⋮ | ⋮ |

| CHARGING STATION ID | PORT NUMBER | CHARGING START TIME | CHARGING END TIME |
|---|---|---|---|
| PPP | KKK | JJ-JJ | II-II |
| ⋮ | ⋮ | ⋮ | ⋮ |

| RESERVATION ID | CHARGING STATION ID | PORT NUMBER | CHARGING START TIME | CHARGING END TIME |
|---|---|---|---|---|
| HHH | PPP | KKK | JJ-JJ | II-II |
| ⋮ | ⋮ | ⋮ | ⋮ | ⋮ |

| AUTHENTICATION ID | RESERVATION ID | USER ID | CHARGING STATION ID | AUTHENTICATION KEY |
|---|---|---|---|---|
| GGG | HHH | ZZZ | PPP | FFF |
| ⋮ | ⋮ | ⋮ | ⋮ | ⋮ |

FIG. 11

| USAGE HISTORY ID | RESERVATION ID | USER ID | CHARGING STATION ID | PORT NUMBER | CHARGING START TIME | CHARGING END TIME |
|---|---|---|---|---|---|---|
| EEE | HHH | ZZZ | PPP | KKK | SS:SS | RR:RR |
| ⋮ | ⋮ | ⋮ | ⋮ | ⋮ | ⋮ | ⋮ |

INFORMATION PROCESSING METHOD AND INFORMATION PROCESSING SYSTEM

CROSS REFERENCE TO RELATED APPLICATIONS

This application is a U.S. continuation application of PCT International Patent Application Number PCT/JP2019/035428 filed on Sep. 10, 2019, claiming the benefit of priority of Japanese Patent Application Number 2018-216672 filed on Nov. 19, 2018, the entire contents of which are hereby incorporated by reference.

BACKGROUND

1. Technical Field

The present disclosure relates to an information processing method and an information processing system.

2. Description of the Related Art

As a method of efficiently using an electric vehicle, Japanese Unexamined Patent Application Publication No. 2011-164771 (PTL 1) discloses a method of reducing waiting time for charging and managing the scheduling of reservations at a charging station, the waiting time being reduced by estimating charging duration and submitting a reservation application for charging to the charging station.

SUMMARY

However, in the conventional technology as disclosed in PTL 1, the efficiency of use of a moving object with a battery, such as an electric vehicle, may be limited. For instance, the occurrence of waiting time for charging the battery may cause interruption to use of the electric vehicle and result in the decreased efficiency of the use of the electric vehicle.

In view of the foregoing, the present disclosure aims to provide an information processing method and an information processing system with which it is possible to improve the efficiency of use of a moving object with a battery.

An information processing method according to one aspect of the present disclosure is implemented by a computer and includes: obtaining a plan including at least locations to which a moving object is expected to travel and stay at; setting, on the basis of the locations included in the plan, a candidate charging location at which the battery of the moving object is chargeable; obtaining the reservation status of a charging station associated with the candidate charging location; and arranging reservation details according to the reservation status of the charging station.

It should be noted that a general or specific embodiment of the information processing method may be realized with a system, a device, an integrated circuit, a computer program, or a computer-readable recording medium such as CD-ROM or may be realized through any combination of the system, the device, the integrated circuit, the computer program, and the recording medium.

The information processing method and the information processing system according to the present disclosure enable the efficiency of use of a moving object with a battery to be improved.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a data table illustrating an example of user information;

FIG. 4 is a data table illustrating an example of a plan;

FIG. 5 is a data table illustrating an example of a delivery plan as a specific example of the plan;

FIG. 6 is a data table illustrating an example of a sales activity plan as a specific example of the plan;

FIG. 7 is a data table illustrating an example of charging station information;

FIG. 8 is a data table illustrating an example of reservation status;

FIG. 9 is a data table illustrating an example of reservation details;

FIG. 10 is a data table illustrating an example of authentication information;

FIG. 11 is a data table illustrating an example of usage history information;

DETAILED DESCRIPTION OF THE EMBODIMENTS

Figure 1:
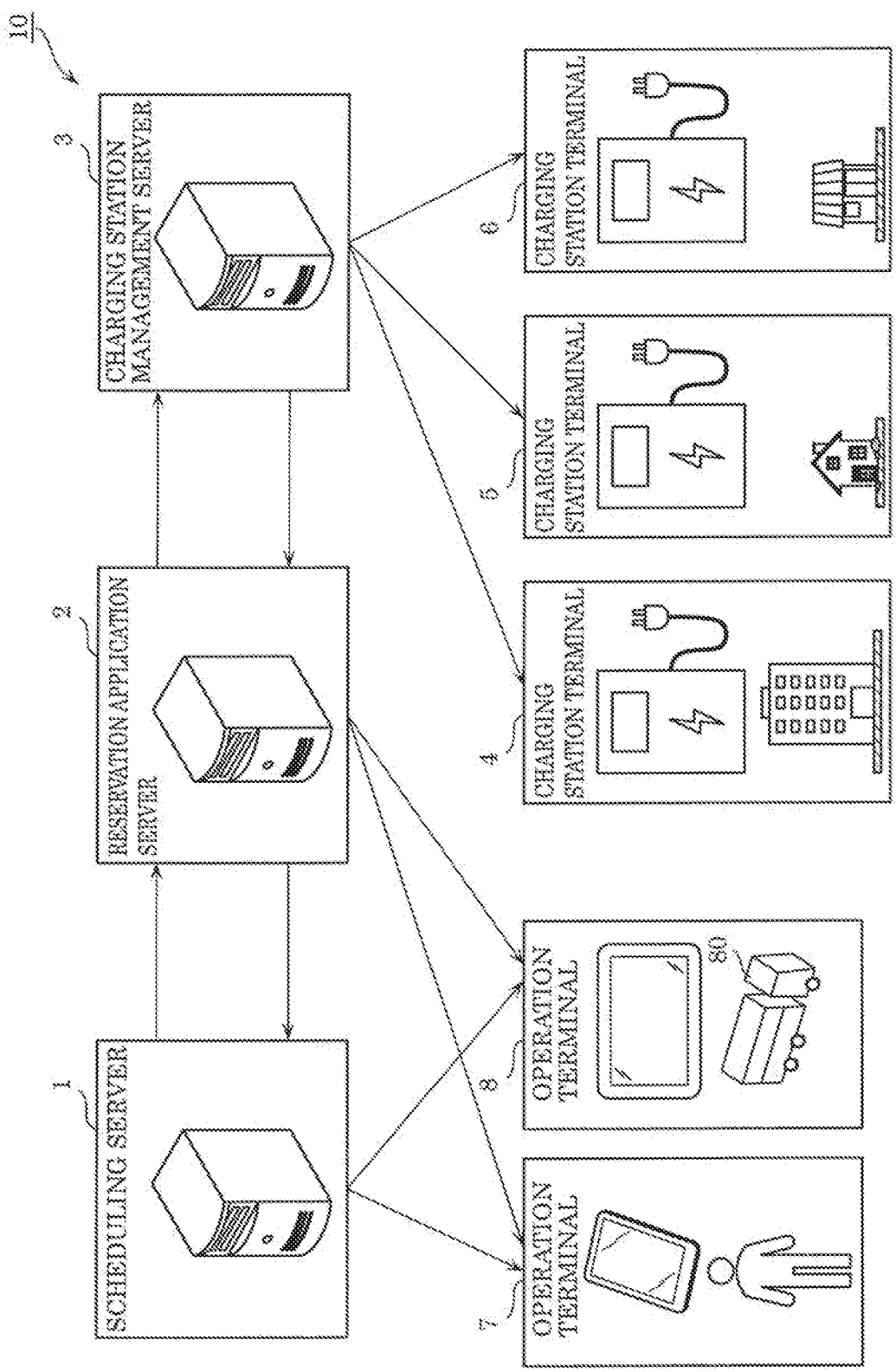
FIG. 1 schematically illustrates a configuration of an information processing system in Embodiment 1.

Hereinafter, the embodiments of the present invention are described with reference to the Drawings. It should be noted that the embodiments described below are not intended to limit the present invention.

Underlying Knowledge Forming the Basis of the Present Disclosure

With the prevalence of electric vehicles in recent years, moving objects with a battery, such as electric vehicles become more widely used in the transportation industry including the delivery business and the taxi business. Meanwhile, the range of such a moving object is shorter than that of a gasoline-powered vehicle or a diesel-powered vehicle. Thus, the battery of the moving object needs more frequent charging. However, it takes more time to charge the battery than to refuel the gasoline-powered vehicle or the diesel-powered vehicle. Thus, in the moving object that uses the power of the battery as driving energy, an ingenious way of charging the battery is needed to make good use of the range.

PTL 1 discloses the method of reducing waiting time for charging by estimating duration for charging the battery of an electric vehicle and submitting a reservation application for charging to a charging station. However, regarding the estimation of the duration for charging the battery, the conventional technology as disclosed in PTL 1 does not take into account actual tasks such as tasks included in a delivery plan. Thus, a task may be interrupted to charge the battery, and consequently, the efficiency of the task may decrease, which is considered a problem.

In the transportation industry, if it is possible to charge the battery of a moving object at a place at which a driver has to stop the moving object to perform a task, charging and the task can be performed in parallel without interrupting the task. Thus, it is possible to make good use of the range of the moving object. It should be noted that the place at which the driver has to stop the moving object to perform the task is, for example, a delivery destination, a rest area, or a place to stop the moving object and wait for a passenger.

In view of the foregoing, the inventors of the present invention have finally arrived at an information processing method and an information processing system with which it is possible to improve the efficiency of use of a moving object with a battery.

An information processing method according to one aspect of the present disclosure is implemented by a computer and includes: obtaining a plan including at least locations to which a moving object is expected to travel and stay at; setting, on the basis of the locations included in the plan, a candidate charging location at which the battery of the moving object is chargeable; obtaining the reservation status of a charging station associated with the candidate charging location; and arranging reservation details according to the reservation status of the charging station.

In the method, the reservation details are arranged according to the reservation status of the candidate charging location set on the basis of the plan, which enables the moving object to travel according to the plan without generating waiting time for charging. Thus, a user can efficiently proceed with the plan, and hence it is possible to improve the efficiency of the use of the moving object with the battery.

In addition, a reservation is automatically made to charge the battery of the moving object, which enables the user to charge the battery of the moving object without searching for a charging station to charge the battery. Thus, the user is less likely to drive the moving object to search for a charging station, which results in reduced power consumption of the moving object.

In the obtaining of the plan, the plan may be received from a scheduling server. In the obtaining of the reservation status, the reservation status may be received from a charging station management server. The information processing method may further include transmitting the reservation details to the charging station management server.

The setting of the candidate charging location may include selecting a candidate charging location from at least one of the group of the locations included in the plan and the group of locations near the locations included in the plan.

Thus, a candidate charging location can be selected not only from the locations included in the plan but also from the locations near the included locations. Thus, as it is possible to increase the number of candidate charging locations, it is possible to effectively select a charging station suitable for the moving object and facilitate charging of the moving object at the right timing.

The plan may include expected stay time at each of the locations included in the plan. The selecting may be based on the expected stay time at each of the locations included in the plan.

Thus, it is possible to select, as a candidate charging location, a location at which sufficient time can be spent on charging the battery.

In the selecting, a candidate charging location may be selected to enable a remaining charge in the battery to change between the upper limit and the lower limit of a charging capacity.

Thus, the user can easily perform operation of the battery without degrading the battery.

The information processing method may further include: making a first determination for determining whether it is possible to reserve the charging station from the reservation status; changing the plan when the result of the first determination shows that it is not possible to reserve the charging station; making a second determination for determining whether it is possible to reserve a charging station associated with a candidate charging location set on the basis of the plan that has been changed; and transmitting the plan that has been changed to the scheduling server when the result of the second determination shows that it is possible to reserve the charging station set after the changing.

Thus, since the plan is changed by giving priority to charging of the moving object, it is possible to decrease the chances of the moving object stopping due to running out of battery charge.

The information processing method may further include: in the changing, rearranging the locations included in the plan; in the second determination, determining whether it is possible to reserve a charging station associated with a candidate charging location set on the basis of the locations rearranged in the changing; and transmitting, to the scheduling server, the plan changed by rearranging the locations and including at least the locations rearranged, the transmitting being performed when the result of the second determination shows that it is possible to reserve the charging station set after the rearranging.

Thus, since the locations included in the plan are rearranged by giving priority to charging of the moving object, it is possible to decrease the chances of the moving object stopping due to running out of battery charge.

In the changing, a change may be made to stay time in at least one of the locations included in the plan.

Thus, since the stay time in at least one of the locations included in the plan is changed by giving priority to charging of the moving object, it is possible to decrease the chances of the moving object stopping due to running out of battery charge.

The information processing method may further include: creating authentication information for use in authentication of the reservation details between the charging station and the moving object; and transmitting the authentication information to the charging station management server and the terminal of the user of the moving object.

This can facilitate granting of permission to charge the moving object at the charging station during a reserved time slot. Moreover, it is possible to prevent an indefinite number of users from using the charging station.

The information processing method may further include: receiving, from the charging station management server, charging history information indicating a history of charging of the moving object at the charging station; deriving the result of usage of the charging station from the charging history information; and transmitting the result of the usage to the terminal of the user of the moving object.

Thus, it is possible to easily derive the result of the usage and notify the result of the usage to the user of the moving object.

The information processing method may further include: setting a benefit to be granted to the administrator of the charging station, on the basis of the charging history information; and transmitting information on the benefit to the charging station management server or the terminal of the administrator.

Since the information on the benefit, which has been set on the basis of the charging history information, is transmitted to the administrator of the charging station, the administrator of the charging station is encouraged to use an information processing system.

It should be noted that a general or specific embodiment of the information processing method may be realized with a system, a device, an integrated circuit, a computer program, or a computer-readable recording medium such as CD-ROM or may be realized through any combination of the system, the device, the integrated circuit, the computer program, and the recording medium.

Hereinafter, an information processing method and an information processing system according one aspect of the present disclosure are described in detail with reference to the Drawings.

It should be noted that any of the embodiments described below is a mere specific example of the present disclosure. The numerical values, the shapes, the materials, the structural elements, the positions of the structural elements, the connections between the structural elements, the steps, the order of the steps, and other details given in the following embodiments are mere examples and are not intended to limit the present disclosure. Among the structural elements described in the following embodiments, the structural elements not included in the independent claims, which represent superordinate concepts, are given as optional structural elements.

Embodiment 1

Hereinafter, Embodiment 1 is described with reference to FIGS. 1 to 14.

1-1. Configuration

FIG. 1 schematically illustrates a configuration of an information processing system according to Embodiment 1.

Specifically, FIG. 1 illustrates information processing system 10 that includes scheduling server 1, reservation application server 2, charging station management server 3, charging station terminals 4 to 6, and operation terminals 7 and 8. Among the structural elements, information processing system 10 includes at least reservation application server 2.

As a plan, scheduling server 1 makes a task plan such as a delivery plan or a sales activity plan. Schedule making server 1 is, for example, an information processing device serving as a computer. Schedule making server 1 may be made up of more than one device.

Reservation application server 2 receives a plan from scheduling server 1 and submits a reservation application for charging at a charging station, based on the received plan. Specifically, by using the received plan, reservation application server 2 arranges reservation details for charging. Then, reservation application server 2 submits the reservation application for charging by transmitting the reservation details to charging station management server 3. The reservation details for charging include information indicating a charging station and a charging time slot. When arranging the reservation details, reservation application server 2 inquires of charging station management server 3 about the reservation status of a target charging station and selects a charging time slot from the available charging time slots of the target charging station. When the target charging station accepts a reservation based on the submitted reservation application, reservation application server 2 transmits the arranged reservation details to operation terminal 7 or 8.

It should be noted that reservation application server 2 may transmit the arranged reservation details to operation terminal 7 or 8 via scheduling server 1. That is, in that case, reservation application server 2 transmits the arranged reservation details to scheduling server 1, which then transmits the reservation details received from reservation application server 2 to operation terminal 7 or 8.

After a person charges moving object 80 at the charging station according to the reservation details of the reservation application for charging, reservation application server 2 receives charging history information from charging station management server 3. The charging history information includes charging duration spent on charging moving object 80. This enables reservation application server 2 to calculate a usage fee from the charging duration included in the charging history information and transmits information on the calculated usage fee to scheduling server 1 to charge the usage fee. It should be noted that if there is a main user of moving object 80, apart from the person who has charged moving object 80, reservation application server 2 may charge the main user for the usage fee by transmitting the information on the usage fee to the terminal of the main user instead of scheduling server 1.

It should be noted that reservation application server 2 is, for example, an information processing device serving as a computer. Reservation application server 2 may be made up of more than one device.

Charging station management server 3 manages the reservation status of each of charging stations. Charging station management server 3 exchanges information with reservation application server 2 and receives a reservation application for charging. Charging station management server 3 is, for example, an information processing device serving as a computer. Charging station management server 3 may be made up of more than one device.

Each of charging station terminals 4 to 6 is the terminal of a charging station for charging a moving object with a battery. Charging station terminal 4 is installed in an apartment building. Charging station terminal 5 is installed in a detached house. Charging station terminal 6 is installed in other building. According to the installation place, charging station terminals 4 to 6 are classified into a terminal for an apartment building, a terminal for a detached house, and a terminal for other building.

Operation terminal 7 is a terminal operated by a person who performs their task. Operation terminal 8 is a terminal installed in moving object 80 such as an electric vehicle driven by the person who performs their task. Operation terminal 7 is, for example, a portable terminal such as a smartphone, a tablet computer, or a laptop personal computer (PC), or an information processing device serving as a computer such as a desktop PC. Operation terminal 8 is, for example, an information processing device serving as a computer, such as a car navigation system. Operation terminal 8 may be a device such as a smartphone or a tablet computer. A plan for moving object 80 made by scheduling server 1 is transmitted to corresponding operation terminal 7 or 8. Operation terminal 7 or 8 displays a screen showing plan details based on the received plan. This enables the user to proceed with the plan by traveling with moving object 80 according to the plan included in the details shown on the displayed screen.

It should be noted that scheduling server 1 and reservation application server 2 are connected to each other to enable communication therebetween via a network. Each of scheduling server 1 and reservation application server 2 is connected to each of operation terminals 7 and 8 to enable communication therebetween via the network. Reservation application server 2 and charging station management server 3 are connected to each other to enable communication therebetween via the network. Charging station management server 3 is connected to each of charging station terminals 4 to 6 to enable communication therebetween via the network. It should be noted that as the network for transmitting and receiving information, information processing system 10 may use a general-purpose network such as the Internet or a dedicated network such as a dedicated line.

It should be noted that hereinafter, an electric vehicle is cited as an example of moving object 80. However, moving object 80 is not limited to an electric vehicle and may be an electric motorcycle, a battery-powered aircraft, or a battery-powered watercraft.

Figure 2:
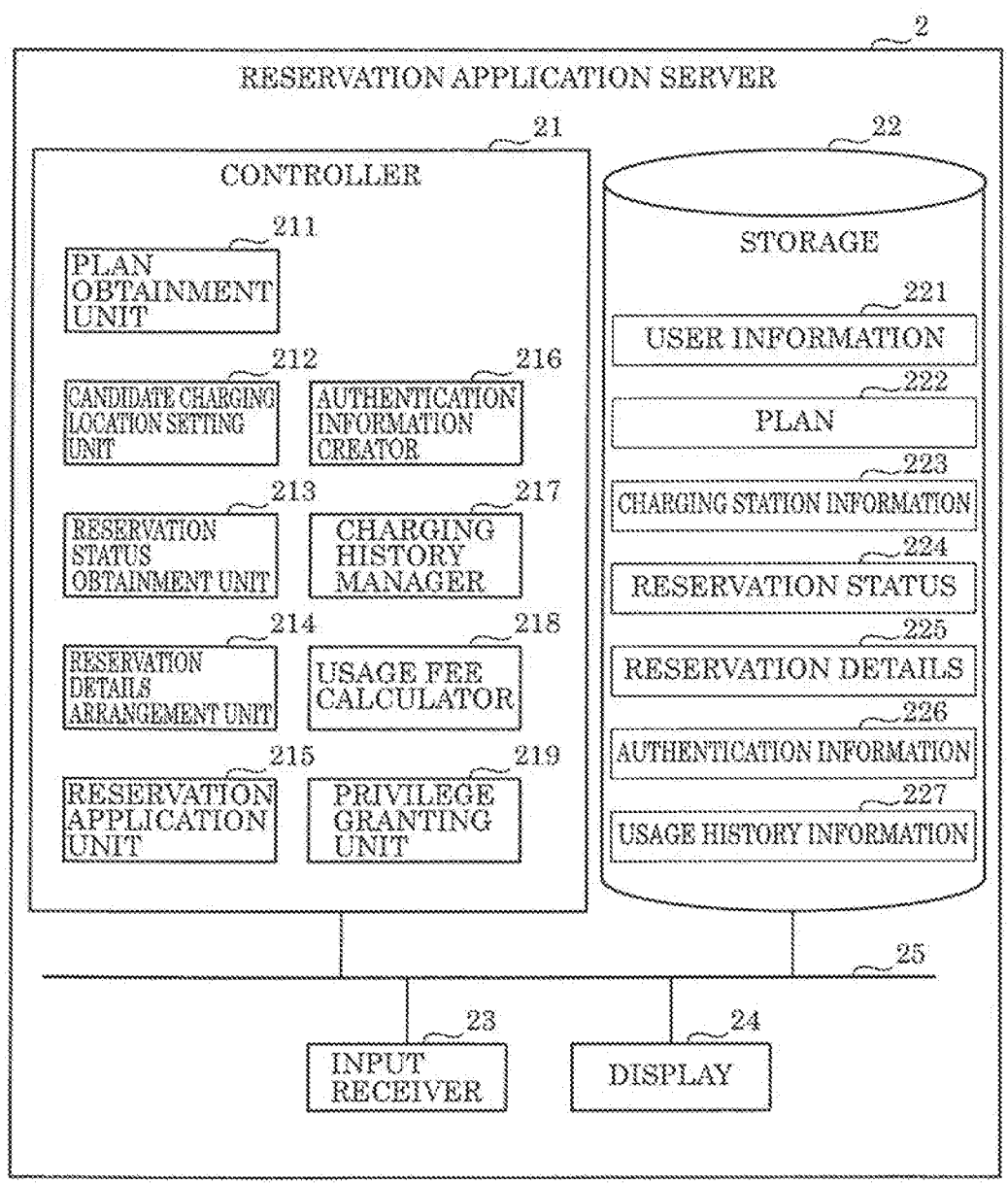
FIG. 2 is a block diagram schematically illustrating a configuration of a reservation application server in Embodiment 1.

With reference to FIG. 2, a functional configuration of reservation application server 2 is described.

FIG. 2 is a block diagram schematically illustrating a functional configuration of reservation application server 2.

As illustrated in FIG. 2, reservation application server 2 includes controller 21, storage 22, input receiver 23, display 24, and communication unit 25.

Controller 21 includes plan obtainment unit 211, candidate charging location setting unit 212, reservation status obtainment unit 213, reservation details arrangement unit 214, reservation application unit 215, authentication information creator 216, charging history manager 217, usage fee calculator 218, and privilege granting unit 219. In controller 21, the processing of each of the structural elements is performed for each of moving objects 80. Hereinafter, with regard to the processing for one of moving objects 80, the function of each of the processing units is described.

Schedule obtainment unit 211 obtains plan 222 including at least locations to which moving object 80 is expected to travel and stay at. The plan includes, for example, expected stay time at each of the locations. For instance, plan obtainment unit 211 receives plan 222 from scheduling server 1 via communication unit 25. Storage 22 stores plan 222 received by plan obtainment unit 211.

In addition, plan obtainment unit 211 may receive plan 222 from scheduling server 1 by transmitting a request for the plan to scheduling server 1 at predetermined first timing. The predetermined first timing may be, for example, the time when scheduling server 1 completes the creation of plan 222 for moving object 80 that is the processing target, a time, a predetermined period before the start time of a series of tasks included in plan 222 within a predetermined time unit such as one day, or a fixed time within the predetermined time unit. The frequency of the predetermined first timing may be once or more than once within the predetermined time unit. In addition, scheduling server 1 may transmit plan 222 to reservation application server 2 at the predetermined first timing. In that case, plan obtainment unit 211 does not have to transmit the request for the plan to scheduling server 1. It should be noted that the details of plan 222 are described later with reference to FIGS. 4 to 6.

On the basis of locations included in the plan received by plan obtainment unit 211, candidate charging location setting unit 212 sets a candidate charging location at which the battery of the moving object 80 is chargeable. Candidate charging location setting unit 212 sets a candidate charging location by selecting the candidate charging location from at least one of the group of the locations included in plan 222 and the group of locations near the included locations. The locations near the included locations are within predetermined distances from the included locations. For instance, when each of the included locations is considered the center of a circle having a radius of r1, each of the locations near the included locations is within the corresponding circle. Specifically, candidate charging location setting unit 212 may set a candidate charging location on the basis of charging station information 223 including the specifications of each of charging stations installed in at least one of the group of the included locations and the group of the locations near the included locations. The specifications of a charging station includes, for example, the number of charging ports and the charging standard of the charging station. As a candidate charging location, candidate charging location setting unit 212 may set the location of a charging station that conforms to a charging standard with a lower degradation level than the charging standards of charging stations at other locations. Moreover, selecting of a candidate charging location is not limited to selecting from at least one of the group of the locations included in the plan and the group of the locations near the included locations. Instead, as a candidate charging location, candidate charging location setting unit 212 may select a location on a travel route including the locations included in the plan. When a location on the travel route is selected as a candidate charging location, the selected candidate charging location may be used as a rest area.

Reservation application server 2 may receive charging station information 223 from charging station management server 3 via communication unit 25, or storage 22 may pre-store charging station information 223. When reservation application server 2 receives charging station information 223 from charging station management server 3, storage 22 stores charging station information 223. The details of charging station information 223 are described later with reference to FIG. 8.

Moreover, candidate charging location setting unit 212 may select a candidate charging location on the basis of expected stay time at each of the locations included in plan 222. For instance, as a candidate charging location, candidate charging location setting unit 212 may select, from the included locations, a location at which stay time is longer than threshold T1.

In addition, candidate charging location setting unit 212 may select a candidate charging location on the basis of costs charged by each charging station. For instance, as a candidate charging location, candidate charging location setting unit 212 may select, from the included locations, a location at which a charging fee or parking fee is lower than that at other candidate locations.

Reservation status obtainment unit 213 obtains reservation status 224 of a charging station associated with the candidate charging location set by candidate charging location setting unit 212. For instance, reservation status obtainment unit 213 receives reservation status 224 of the charging station associated with the candidate charging location from charging station management server 3 via communication unit 25. Reservation status 224 includes charging time slots reserved for moving objects at the corresponding charging station, the charging time slots being part of future time slots. In addition, reservation status 224 may include, for example, an available time slot obtained by removing the reserved time slots from the future time slots. After candidate charging location setting unit 212 sets the candidate charging location, reservation status obtainment unit 213 may receive reservation status 224 from charging station management server 3 by transmitting a request for reservation status 224 to charging station management server 3. The details of reservation status 224 are described later with reference to FIG. 9.

When reservation status obtainment unit 213 receives reservation status 224, reservation details arrangement unit 214 arranges reservation details 225 according to reservation status 224. Specifically, reservation details arrangement unit 214 selects a charging time slot to be reserved from the available charging time slots of the charging station at the selected candidate charging location. For instance, reservation details arrangement unit 214 calculates the available charging time slots by removing the reserved time slots from the future time slots. Then, as the charging time slot to be reserved, reservation details arrangement unit 214 selects, from the calculated available charging time slots, the time slot during which moving object 80 is expected to stay at the candidate charging location according to plan 222. Thus, reservation details arrangement unit 214 arranges reservation details 225 including information on the charging station at which moving object 80 is expected to be charged and the charging time slot to be reserved at the charging station. In addition, reservation details arrangement unit 214 may arrange reservation details 225 that further include information on a charging standard indicating whether normal charging or fast charging should be performed. It should be noted that when reservation status 224 includes the available charging time slots, reservation details arrangement unit 214 may omit calculation of the available charging time slots. Reservation details 225 are described later in detail with reference to FIG. 10.

Reservation application unit 215 submits a reservation application by transmitting reservation details 225 arranged by reservation details arrangement unit 214 to charging station management server 3 via communication unit 25. It should be noted that transmission of reservation details 225 to charging station management server 3 does not have to be performed by reservation application unit 215 but may be performed via another device.

When the result of the reservation application received by communication unit 25 shows that the charging station has accepted the reservation, authentication information creator 216 creates authentication information 226 for use in authentication of reservation details 225 between the charging station and moving object 80. It should be noted that authentication information creator 216 may transmit the details of the reservation accepted by the charging station to operation terminals 7 or 8. Thus, operation terminal 7 or 8 can display the reservation details, which enables the user to charge moving object 80 at the charging station specified in the reservation details.

Moreover, authentication information creator 216 transmits, via communication unit 25, created authentication information 226 to charging station management server 3 and operation terminal 7 or 8 of the user of moving object 80. After receiving authentication information 226, charging station management server 3 transmits authentication information 226 to the charging station terminal of the reserved charging station. It should be noted that instead of transmitting authentication information 226 to charging station management server 3, authentication information creator 216 may transmit authentication information 226 to the charging station terminal of the reserved charging station.

This enables transmission of authentication information 226 to operation terminal 7 or 8 of the user of moving object 80 and the charging station reserved by the user. Authentication information 226 is information for granting permission to charge according to the reservation. Thus, it is possible to facilitate granting of permission to charge moving object 80 at the charging station during the reserved time slot. This can prevent an indefinite number of users from using the charging station. The details of authentication information 226 are described later with reference to FIG. 11.

Charging history manager 217 receives usage history information 227 from charging station management server 3 via communication unit 25, usage history information 227 indicating a history of usage of the charging station by moving object 80. Charging history manager 217 manages received usage history information 227 by, for example, storing and accumulating usage history information 227 for each moving object. Charging history manager 217 may delete, from usage history information 227, charging history information for which payment for a usage fee is complete or a predetermined period has elapsed. That is, charging history manager 217 manages usage history information 227 by deleting old information from usage history information 227 stored for each moving object and adding newly obtained information to usage history information 227.

Moreover, charging history manager 217 may receive usage history information 227 from charging station management server 3 by transmitting a request for usage history information 227 to charging station management server 3 at predetermined second timing. The predetermined second timing may be a fixed time within a predetermined time unit such as one day. The frequency of the predetermined second timing may be once or more than once within the predetermined time unit. Moreover, charging station management server 3 may transmit usage history information 227 to reservation application server 2 at the predetermined second timing. In that case, charging history manager 217 does not have to transmit the request for usage history information 227 to charging station management server 3. The details of usage history information 227 are described with reference to FIG. 12.

Usage fee calculator 218 derives the result of usage of the charging station from usage history information 227 received by charging history manager 217. Usage fee calculator 218 may derive the result of the usage from charging duration or charging power consumption that is information included in usage history information 227. Usage fee calculator 218 may derive the result of the usage from a charge per unit set for each of pre-divided time slots and the charging duration or the charging power consumption. Moreover, usage fee calculator 218 may derive the result of the usage according to whether fast charging or normal charging has been performed. As the result of the usage, usage fee calculator 218 may calculate a usage fee or usage points as an alternate to the usage fee. In addition, after deriving the result of the usage, usage fee calculator 218 transmits the derived result of the usage to operation terminal 7 or 8 of the user of moving object 80, which is the processing target, and thus requests the user to pay for the result of the usage with, for example, money or points.

Hence, it is possible to easily derive the result of the usage and transmit the result of the usage to the user of the moving object.

On the basis of usage history information 227 received by charging history manager 217, privilege granting unit 219 sets a privilege as a benefit to be granted to the administrator of the charging station. Privilege granting unit 219 transmits information on the set privilege to charging station management server 3 or the terminal of the administrator of the charging station. For instance, when the user of moving object 80 is a deliverer of a delivery company, the privilege may be a discount on a delivery charge offered by the delivery company. In another example, when the user of moving object 80 is a person from a company that sells goods or services, the privilege may be a discount on their goods or services. The privilege encourages the administrator of the charging station to use information processing system 10.

It should be noted that controller 21 does not have to include authentication information creator 216, charging history manager 217, usage fee calculator 218, or privilege granting unit 219.

Controller 21 is made up of, for example, a processor and memory, the processor running a predetermined program and the memory storing the predetermined program. Controller 21 is not limited to a device including a processor and memory and may be a dedicated circuit. That is, each of the structural elements of controller 21 may be caused to function by the processor running the software program stored in the memory or may be dedicated hardware.

It should be noted that an administrator terminal operated by the administrator may also have functions equivalent to those of controller 21 in case of emergency. In that case, the administrator can directly operate controller 21 by operating the administrator terminal. It should be noted that a safe system capable of minimizing effects from a third party is employed as the system of communication between the administrator terminal and controller 21.

Storage 22 stores user information 221, plan 222, charging station information 223, reservation status 224, reservation details 225, authentication information 226, and usage history information 227. Storage 22 is a storage device such as a hard disk drive or flash memory. Storage 22 stores, for example, information received from an external device, information received by input receiver 23, and information created by performing each processing of controller 21.

User information 221 is pre-registered user information.

FIG. 3 is a data table illustrating an example of user information 221. As illustrated in FIG. 3, user information 221 includes user ID, user name, user address, user terminal type, and user email address. The user ID uniquely identifies a user. The user terminal type is information identifying, for example, whether the terminal of the user is a portable terminal such as operation terminal 7 or a terminal installed in a vehicle, such as operation terminal 8.

Schedule 222 is a task plan made by scheduling server 1.

FIG. 4 is a data table illustrating an example of plan 222. As illustrated in FIG. 4, plan 222 includes user ID, arrival time, departure time, task, name of task performing place, and address of task performing place. Schedule 222 includes locations with the names of task performing places and the addresses of task performing places. In addition, in plan 222, expected stay time at each of the locations is known from the arrival time and the departure time. The stay time is duration from the arrival time to the departure time. The stay time may be added to the items of plan 222. Schedule 222 is related to tasks involving driving moving object 80. Schedule 222 is, for example, a task plan such as a delivery plan or a sales activity plan. It should be noted that to enable charging without interrupting a task, reservation application server 2 analyzes plan 222 and arranges reservation details to reserve a charging station.

FIG. 5 is a data table illustrating an example of a delivery plan as a specific example of plan 222. For the delivery plan, tasks include, for example, delivery, collection, loading, unloading, resting, inspection, and waiting for unloading. The tasks illustrated in FIG. 5 relate to delivery.

FIG. 6 is a data table illustrating an example of a sales activity plan as a specific example of plan 222. For the sales activity plan, tasks include, for example, performing sales activities, having a business meeting, closing a deal, resting, and waiting.

Charging station information 223 is information on charging stations that receive an inquiry about the reservation status or a reservation application from reservation application server 2.

FIG. 7 is a data table illustrating an example of charging station information 223. As illustrated in FIG. 7, charging station information 223 includes charging station ID, name of installation place, address of installation place, number of charging ports, and charging standard. The charging station ID uniquely identifies a charging station. The charging standard provides information on the characteristics of a charging station, the information being necessary when using the charging station. The characteristics include, for example, the availability of fast charging and the type of plug. It should be noted that if there are operating hours during which the charging station is available (that is, if there is a period during which the charging station is unavailable), the charging station information may include the start time and the end time of the operating hours. Thus, it is possible to identify the period from the start time to the end time as the operating hours during which the charging station is available. In addition, it is possible to identify the period from the end time to the next start time as a period during which the charging station is unavailable. Since usage fees may vary among charging stations, the charging station information may include usage fee. By using charging station information 223, controller 21 can extract charging stations associated with locations at which tasks are performed or locations near the locations at which the tasks are performed. Moreover, by the stay time at each of the locations at which the tasks are performed and the charging standard which moving object 80 is compatible with, controller 21 can further narrow down the extracted charging stations and select a candidate charging station.

Reservation status 224 is information on the reservation status of each of charging stations.

FIG. 8 is a data table illustrating an example of reservation status 224. As illustrated in FIG. 8, reservation status 224 includes charging station 1D, port number, charging start time, and charging end time. It should be noted that when the charging station has more than one charging port, port numbers serve as charging port IDs uniquely identifying the charging ports. Controller 21 can check the operation status of each of the charging stations by using reservation status 224 and arrange reservation details for charging so as not to generate waiting time for charging. Moreover, by analyzing accumulated reservation status 224, controller 21 can extract characteristic operation patterns for each of the charging stations. This enables controller 21 to arrange the reservation details for charging that reflect the operation patterns of the charging station.

Reservation details 225 are information on the details of a reservation application submitted to a charging station.

FIG. 9 is a data table illustrating an example of reservation details 225. As illustrated in FIG. 9, reservation details 225 include reservation ID, charging station ID, port number, charging start time, and charging end time. The reservation ID uniquely identifies reservation details. It should be noted that reservation details 225 may include information indicating whether a reservation is established as a result of the reservation application. When constant patterns are found in tasks, for example, for each week, by using past reservation details 225, controller 21 may identify the tasks of regular patterns without analyzing the task plan and arrange reservation details for charging according to the identified tasks.

With authentication information 226, the user can charge moving object 80 at the charging station according to the established reservation.

FIG. 10 is a data table illustrating an example of authentication information 226. As illustrated in FIG. 10, authentication information 226 includes authentication ID, reservation ID, user ID, charging station ID, and authentication key. The authentication ID uniquely identifies authentication. It should be noted that the items included in authentication information 226 may vary according to the authentication type.

Usage history information 227 is information on the history of usage by the user of moving object 80, the information being used for, for example, calculating a usage fee or setting and granting a privilege.

FIG. 11 is a data table illustrating an example of usage history information 227. As illustrated in FIG. 11, usage history information 227 includes usage history ID, reservation ID, user ID, charging station ID, port number, charging start time, and charging end time. It should be noted that usage history information 227 does not necessarily have to include the reservation ID. This is to record information on usage without a reservation as usage history.

Input receiver 23 has, for example, the function of receiving a command to directly drive controller 21 from the operator of reservation application server 2 and the function of receiving a command to manage information stored in storage 22 from the operator. Managing the information stored in storage 22 includes: deleting various information stored in storage 22; adding various information; organizing the storage places of the various information; and organizing the names of the various information. In addition, input receiver 23 may have the function of receiving a command to perform maintenance management for reservation application server 2.

Display 24 displays information stored in storage 22 or operation procedures to perform the functions of the processing units of controller 21 of reservation application server 2. Moreover, reservation application server 2 may display information on operation of reservation application server 2. Display 24 may display, where necessary, input information received by input receiver 23 or the result of processing that controller 21 has performed according to information received from an external device. Display 24 is, for example, a liquid crystal display or an organic electro luminescence (EL) display.

Communication unit 25 communicates with each of the devices inside reservation application server 2 or each of external devices such as scheduling server 1, charging station management server 3, and charging station terminals 4 to 8. Communication unit 25 is a communication interface (IF) for connecting to a wireless or wired local area network (LAN).

1-2. Operation

Figure 12:
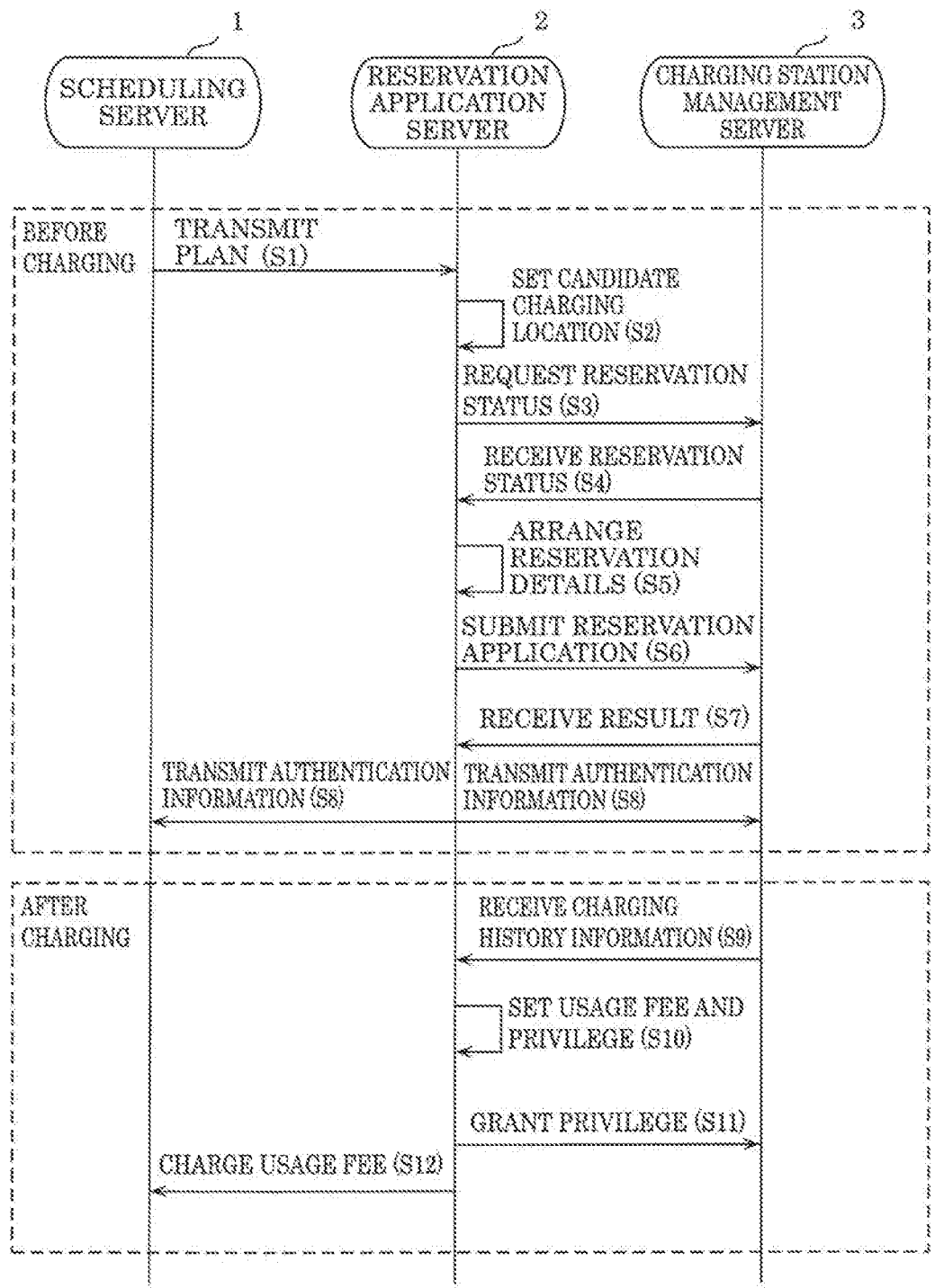
FIG. 12 is a sequence diagram illustrating an example of operation of the information processing system according to Embodiment 1.
Figure 13:
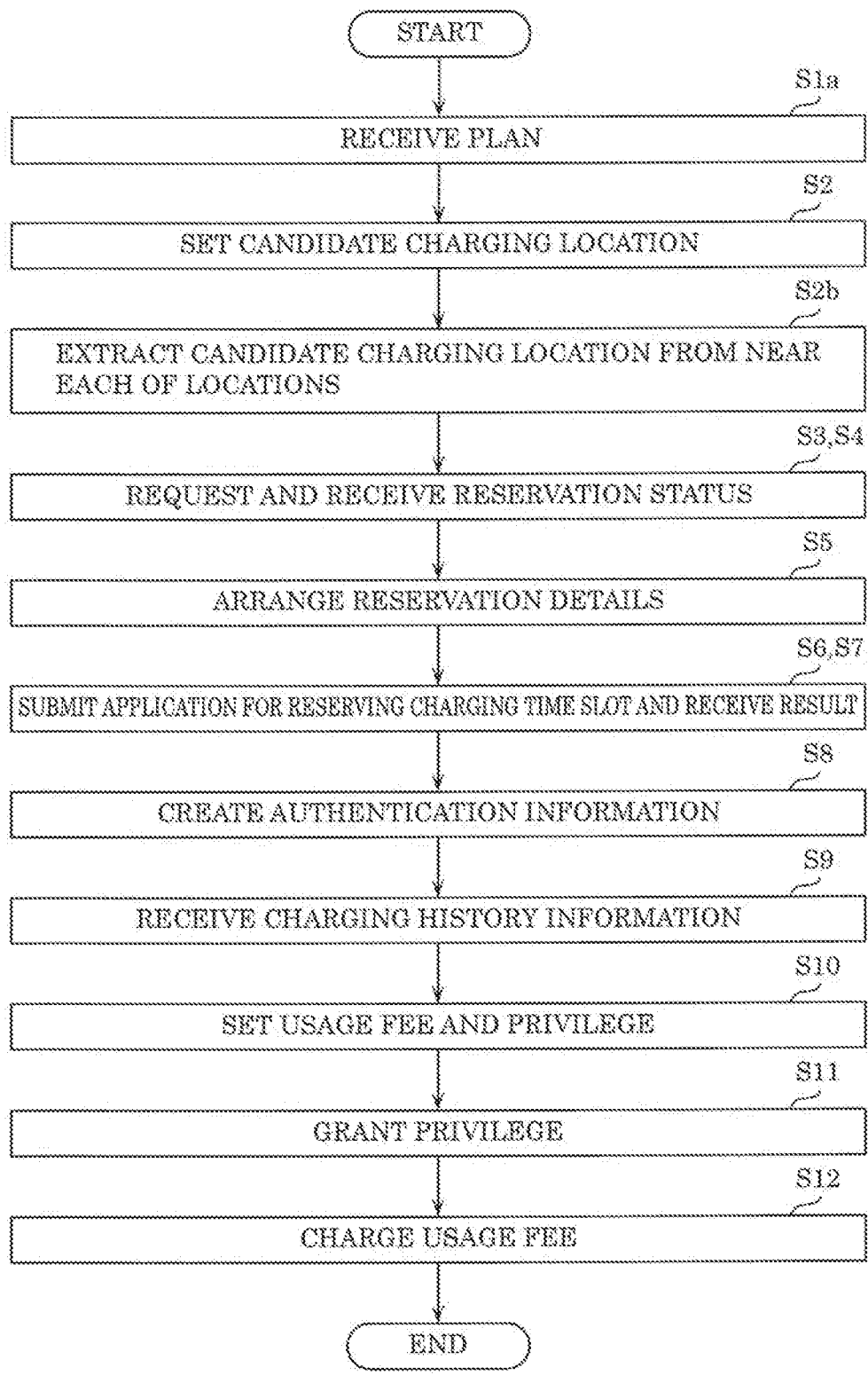
FIG. 13 is a flowchart illustrating an example of operation of the reservation application server in the operation illustrated in FIG. 12.

With reference to FIGS. 12 and 13, operation of information processing system 10 is described.

Figure 14:
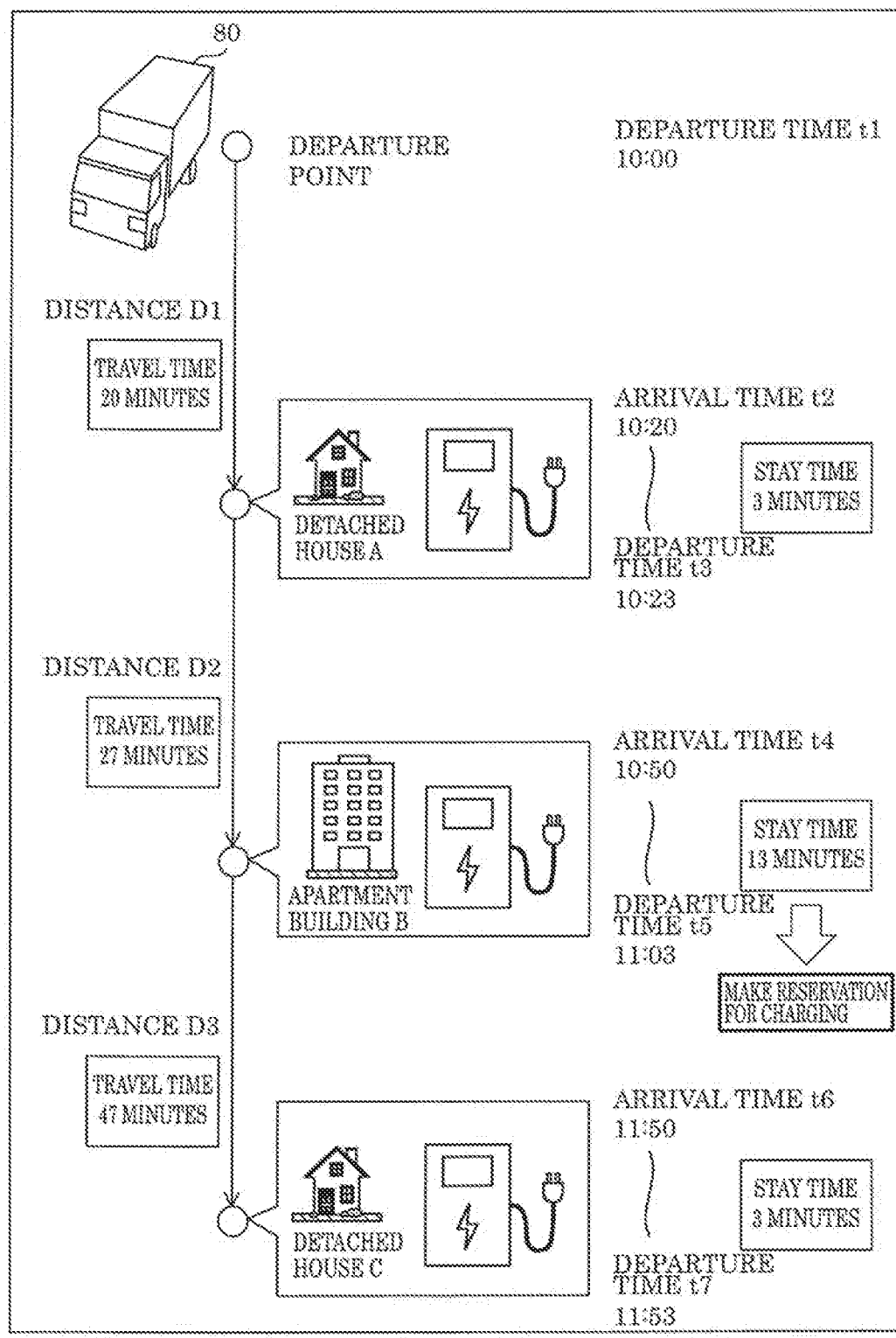
FIG. 14 explains a reservation for charging to be made when performing a delivery task with a moving object according to the delivery plan illustrated in FIG. 5.

FIG. 12 is a sequence diagram illustrating an example of operation of information processing system 10 according to Embodiment 1. FIG. 13 is a flowchart illustrating an example of operation of reservation application server 2 in the operation illustrated in FIG. 12. FIG. 14 explains a reservation for charging to be made when performing the delivery tasks with moving object 80 according to the delivery plan illustrated in FIG. 5.

First, operation of information processing system 10 before charging is described.

Schedule making server 1 makes plan 222 and transmits made plan 222 to reservation application server 2 (S1). As illustrated in FIG. 5, moving object 80 travels according to plan 222. That is, the user of moving object 80 drives moving object 80 according to plan 222. Specifically, as illustrated in FIG. 14, the user departs the starting point at departure time t1 of 1000 and drives moving object 80 to detached house A, traveling distance D1. It takes 20 minutes to travel distance D1.

Then, the user arrives at detached house A at arrival time t2. The user stops moving object 80 for three minutes near detached house A to deliver package P1 to detached house A. The user departs detached house A at departure time t3, which is three minutes after arrival time t2, and drives moving object 80 to apartment building B, traveling distance D2. It takes 27 minutes to travel distance D2.

Then, the user arrives at apartment building B at arrival time t4. The user stops moving object 80 for 13 minutes near apartment building B to deliver packages P2 to P4 to apartment building B. The user departs apartment building B at departure time t5, which is 13 minutes after arrival time t4, and drives moving object 80 to detached house C, traveling distance D3. It takes 47 minutes to travel distance D3.

Then, the user arrives at detached house C at arrival time t6 The user stops moving object 80 for three minutes near detached house C to deliver package P5 to detached house C. The user departs detached house C at departure time t7, which is three minutes after arrival time t6, and drives moving object 80 to the next delivery destination.

Hereinafter, with reference to FIG. 13, an example of the operation of reservation application server 2 in the operation of information processing system 10 is described.

When receiving plan 222 (S1a), reservation application server 2 selects a candidate charging location from at least one of the group of locations included in plan 222 and the group of locations near the included locations (S2). The included locations are indicated with the names of task performing places or the addresses of task performing places. For instance, reservation application server 2 extracts detached house A, apartment building B, and detached house C as the locations included in plan 222. Then, as a candidate charging location, reservation application server 2 selects apartment building B at which stay time is longer than threshold T1 (e.g., 10 minutes). As already explained when explaining the function of candidate charging location setting unit 212, a detailed explanation for the processing of setting a candidate charging location is omitted.

After setting the candidate charging location, reservation application server 2 transmits a request for reservation status 224 to charging station management server 3 that controls a charging station installed at the set candidate charging location (S3). Then, reservation application server 2 receives reservation status 224 from charging station management server 3 (S4). That is, reservation application server 2 receives, from charging station management server 3, reservation status 224 of the charging station installed at the candidate charging location. As already explained when explaining the function of reservation status obtainment unit 213, a detailed explanation for the processing of obtaining reservation status 224 is omitted. The reservation status transmitted from charging station management server 3 includes information related to the available time slots of the charging station to enable reservation application server 2 to arrange reservation details.

After receiving reservation status 224, reservation application server 2 arranges reservation details 225 according to reservation status 224 (S5). As already explained when explaining the function of reservation details arrangement unit 214, a detailed explanation for the processing of arranging reservation details 225 is omitted.

After arranging reservation details 225, reservation application server 2 submits a reservation application by transmitting arranged reservation details 225 to charging station management server 3 (86). Then, reservation application server 2 receives the result of the reservation application from charging station management server 3 (S7).

When the received result of the reservation application shows that the charging station has accepted the reservation, reservation application server 2 creates authentication information 226 for use in authentication of reservation details 225 between the charging station and moving object 80 and transmits created authentication information 226 to the scheduling server and the charging station management server 3 (88). As already explained when explaining the function of authentication information creator 216, detailed explanations for the processing of creating authentication information and the processing of transmitting the authentication information are omitted.

Next, operation of information processing system 10 after charging is described.

Reservation application server 2 receives, from charging station management server 3, usage history information 227 indicating the history of usage of the charging station by moving object 80 (S9). As already explained when explaining the function of charging history manager 217, a detailed explanation for the processing of receiving the usage history information is omitted.

On the basis of received usage history information 227, reservation application server 2 (i) derives the result of the usage and (ii) sets a privilege (S10). Then, reservation application server 2 transmits information on the set privilege to charging station management server 3 (S11) and transmits the derived result of the usage to scheduling server 1 (S12). As already explained when explaining the function of usage fee calculator 218, a detailed explanation for the processing of deriving and transmitting the result of the usage is omitted. In addition, as already explained when explaining the function of privilege granting unit 219, a detailed explanation for the processing of setting a privilege and transmitting information on the set privilege is omitted.

1-3. Advantageous Effects

The information processing method according to Embodiment 1 is implemented by a computer and includes: obtaining a plan including at least locations to which moving object 80 is expected to travel and stay at; setting, on the basis of the locations included in the plan, a candidate charging location at which the battery of the moving object is chargeable; obtaining the reservation status of a charging station associated with the candidate charging location; and arranging reservation details according to the reservation status of the charging station. That is, in the information processing method, the reservation details are arranged according to the reservation status of the candidate charging location set on the basis of the plan. This enables the moving object to travel according to the plan without generating waiting time for charging. Thus, a user can efficiently proceed with the plan. Hence, it is possible to improve the efficiency of use of the moving object with the battery.

In addition, in the information processing method according to Embodiment 1, setting a candidate charging location includes selecting from at least one of the group of the locations included in the plan and the group of locations near the included locations. Thus, a candidate charging station can be selected not only from the locations included in the plan but also from the locations near the included locations. That is, it is possible to increase the number of candidate charging locations. This enables effective selection of a charging station suitable for the moving object and facilitates charging of the moving object at the right timing.

In addition, in the information processing method according to Embodiment 1, the plan includes expected stay time at each of the locations, and the selecting is based on the expected stay time at each of the locations. Thus, it is possible to select, as a candidate charging location, a location at which sufficient time can be spent on charging.

Embodiment 2

Embodiment 2 is described below.

In information processing system 10 according to Embodiment 2, scheduling server 1 may transmit the status of the battery of moving object 80 to reservation application server 2. Thus, candidate charging location setting unit 212 of controller 21 of reservation application server 2 may select a candidate charging location from at least one of the group of locations included in plan 222 and the group of locations near the included locations so that remaining battery charge indicated by the received statue of the battery changes between upper limit Th1 and lower limit Th2 of the charging capacity of the battery. When the battery is charged, and the remaining battery charge becomes greater than or equal to upper limit Th1, degradation of the battery is promoted. Upper limit Th1 of the remaining battery charge corresponds to, for example, 80% to 90% of the capacity of the fully-charged battery. When the battery is consumed, and the remaining battery charge becomes less than or equal to lower limit Th2, the degradation of the battery is promoted. Lower limit Th2 of the remaining battery charge corresponds to, for example, 10% to 20% of the capacity of the fully-charged battery.

When determining that the remaining battery charge will fall below lower limit Th2 at a first location that is the next destination by consuming power to travel to the first location, candidate charging location setting unit 212 may set a candidate charging location to enable the battery to be charged at a second location at which moving object 80 will stay before the first location. In the order in which moving object 80 stays at the locations included in the plan, the second location should be a location at which moving object 80 will stay before the first location. However, the second location does not necessarily have to be the last location before the first location. That is, in the above order, there may be at least one location between the first location and the second location.

In addition, when determining that the remaining battery charge will exceed upper limit Th1 by charging the battery at the first location, which is the next destination, until a user departs the first location, candidate charging location setting unit 212 may set a candidate charging location to enable the battery to be charged at a third location rather than at the first location, the third location being a location at which moving object 80 will stay after the first location. In the above order, the third location should be a location at which moving object 80 will stay after the first location. However, the third location does not necessarily have to be the next location after the first location. That is, in the above order, there may be at least one location between the first location and the third location.

Figure 15:
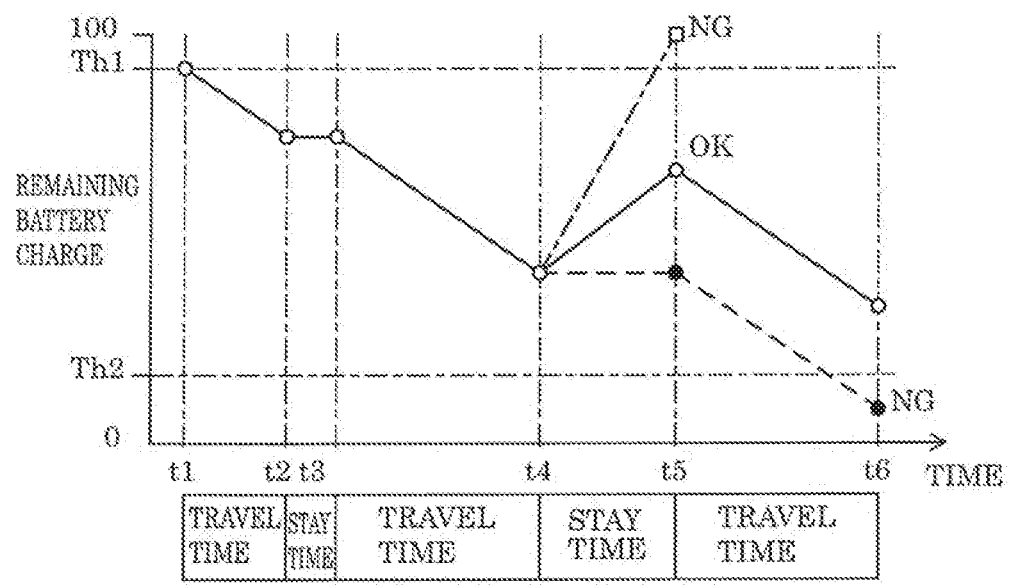
FIG. 15 illustrates an example of the processing of setting a candidate charging location so that remaining battery charge is within upper and lower limits.

FIG. 15 illustrates an example of the processing of setting a candidate charging location so that the remaining battery charge is within upper limit Th1 and lower limit Th2. Times t1 to t6 in FIG. 15 correspond to times t1 to t6 in FIG. 14. That is, FIG. 15 illustrates the processing of setting a candidate charging location, performed when the user performs the delivery tasks with moving object 80 according to the delivery plan illustrated in FIG. 5.

As illustrated in FIG. 15, during the travel time from times t1 to t2, during the travel time from times t3 to t4, and during the travel time from times t5 to t6, moving object 80 is in operation and, thus consumes the battery. Meanwhile, during the stay time from times t2 to t3, the battery can be charged at detached house A at which a charging station is installed, and during the stay time from times t4 to t5, the battery can be charged at apartment building B at which a charging station is installed. In addition, when the battery is not charged at both of detached house A and apartment building B, as illustrated by the dashed line, the remaining battery charge is expected to fall below lower limit Th2 during the travel time from times t5 to t6. Thus, candidate charging location setting unit 212 selects one of detached house A and apartment building B as the candidate charging location.

The stay time from times t4 to 5 is above threshold T1, and the stay time from times t2 to t3 is below or equal to threshold T. Thus, apartment building B is selected as the candidate charging location. When normal charging is performed at apartment building B, as illustrated by the solid line, even after the travel during the travel time from times t5 to t6, the remaining battery charge is above lower limit Th2. Thus, normal charging at apartment building B is set as part of the reservation details.

Meanwhile, for example, when moving object 80 and the charging station at apartment building B are compatible with fast charging, and fast charging is selected, as illustrated by the dash dotted line illustrated in FIG. 15, the remaining battery charge increases and exceeds threshold Th1 at time t5. Thus, as the charging at apartment building B, normal charging is employed rather than fast charging.

In this manner, reservation application server 2 may arrange the reservation details so that a change in the remaining battery charge caused by switching between normal charging and fast charging is within the upper limit and the lower limit. It should be noted that during stay time at one location, switching between the types of charging, such as normal charging and fast charging, may be performed, and switching between performing and not performing charging, such as the start and stop of charging, may be performed. Moreover, switching between the types of charging and switching between the start and stop of charging may be combined.

In addition, the status of the battery is not limited to the remaining battery charge and may indicate, for example, the state of degradation of the battery and the expected temperature of the battery at the time when moving object 80 arrives at each of the locations included in the plan.

Figure 16:
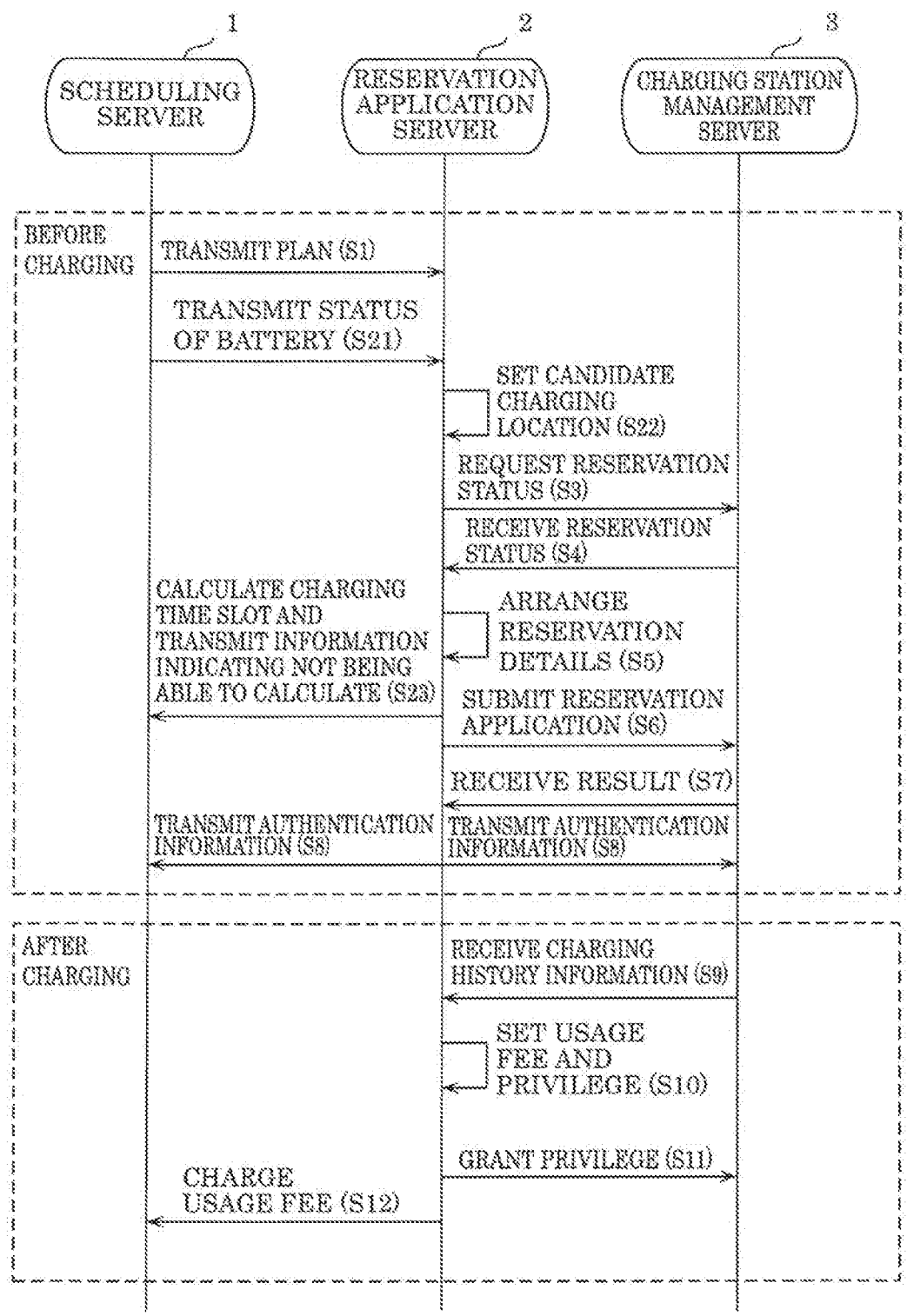
FIG. 16 is a sequence diagram illustrating an example of operation of an information processing system according to Embodiment 2.

FIG. 16 is a sequence diagram illustrating an example of operation of information processing system 10 according to Embodiment 2. It should be noted that the same reference symbol is assigned to processing equivalent to that illustrated in FIG. 12 referenced in Embodiment 1.

Schedule making server 1 transmits plan 222 (S1) and transmits the status of the battery of moving object 80 (S21).

When receiving the status of the battery, reservation application server 2 selects a candidate charging location from at least one of the group of the locations included in plan 222 and the group of the locations near the included locations so that the remaining battery charge indicated by the received status of the battery changes between upper limit Th1 and lower limit Th2 of the charging capacity (S22).

Then, reservation application server 2 performs steps S3 to S5.

After step S5, when not being able to calculate a charging time slot, reservation application server 2 transmits, to scheduling server 1, information indicating not being able to calculate the charging time slot (S23). At that time, reservation application server 2 may transmit battery status information showing the cause of not being able to set a charging time slot.

The processing of steps S6 to S12 performed after step S23 is the same as that described in Embodiment 1, and thus, an explanation is omitted.

In the selecting in the information processing method according to Embodiment 2, a candidate charging location is selected so that the remaining battery charge changes between the upper limit and the lower limit of the charging capacity. Thus, the user can easily perform operation of the battery without degrading the battery.

Embodiment 3

Embodiment 3 is described below.

In information processing system 10 according to Embodiment 3, reservation application server 2 may change a plan when determining that it is not possible to reserve a charging station from reservation status received from charging station management server 3.

Reservation application server 2 makes a first determination for determining whether it is possible to reserve the charging station from the reservation status received from charging station management server 3. When the result of the first determination shows that it is not possible to reserve the charging station, reservation application server 2 changes the plan and makes a second determination for determining whether it is possible to reserve a charging station associated with a candidate charging location set on the basis of the changed plan. When the result of the second determination shows that it is possible to reserve the charging station set after the plan change, reservation application server 2 transmits the changed plan to scheduling server 1. That is, since reservation application server 2 changes the plan by giving priority to charging of the moving object, it is possible to decrease the chances of the moving object stopping due to running out of battery charge.

For instance, as a change made to the plan, reservation application server 2 may rearrange locations included in the plan. Rearranging the locations includes changing the order in which moving object 80 visits locations included in a plan for one moving object. Thus, as a result of reservation application server 2 changing the order, for instance, the moving object can visit and stay at the charging station of the originally set charging location during a time slot available for reservation. Hence, it is possible to charge the moving object during the time slot during which the moving object stays.

In addition, rearranging the locations includes rearranging locations included in plans for moving objects, among the plans. Thus, by rearranging the locations among the plans, reservation application server 2 can aggregate tasks distributed among the moving objects, which enables the moving objects to travel efficiently.

In that case, in the second determination, reservation application server 2 determines whether it is possible to reserve a charging station associated with a candidate charging location set on the basis of the locations rearranged in the plan change. When the result of the second determination shows that it is possible to reserve the charging station set after the rearrangement, reservation application server 2 transmits, to scheduling server 1, the plan changed by rearranging the locations and including at least the rearranged locations. That is, reservation application server 2 rearranges the locations included in the plan(s) by giving priority to charging of the moving object. Thus, it is possible to decrease the chances of the moving object stopping due to running out of battery charge.

As a change made to the plan, reservation application server 2 may change, for example, stay time in at least one of the locations included in the plan. For instance, when the result of the first determination shows that it is not possible to reserve the charging station, reservation application server 2 extends stay time at the location associated with the charging station, which enables the user to charge moving object 80 during the next time slot after a reserved time slot. In that case, reservation application server 2 may extend stay time at a location at which moving object 80 will stay before the location of the charging station. Thus, it is possible to prevent moving object 80 from not being able to travel due to running out of battery charge.

Figure 17:
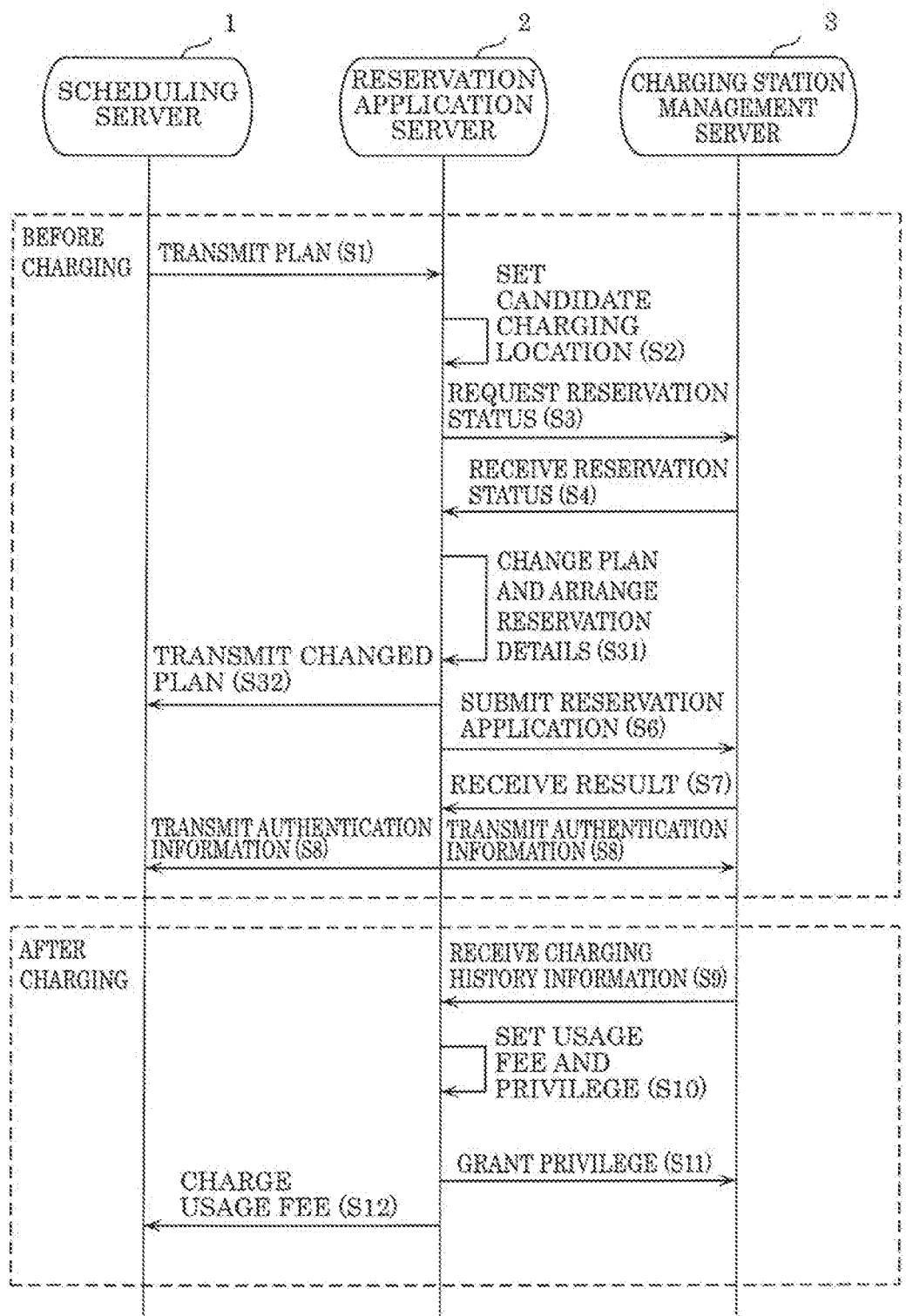
FIG. 17 is a sequence diagram illustrating an example of operation of an information processing system according to Embodiment 3.

FIG. 17 is a sequence diagram illustrating an example of operation of information processing system 10 according to Embodiment 3. It should be noted that in FIG. 17, the same reference symbol is assigned to the processing equivalent to that illustrated in FIG. 12 referenced in Embodiment 1.

Steps S1 to S4 correspond to those described in Embodiment 1, and thus explanations are omitted.

After step S4, when determining that it is not possible to reserve the charging station from the reservation status, reservation application server 2 changes the plan and arranges reservation details on the basis of the changed plan (S31). A detailed explanation for the processing of changing the plan is discussed above and thus omitted.

Reservation application server 2 transmits the changed plan to scheduling server 1 (S32).

The processing of steps S6 to S12 performed after step S32 is same as that described in Embodiment 1, and thus, an explanation is omitted.

It should be noted that each of the structural elements described in Embodiments 1 to 3 may be dedicated hardware or be caused to function by running a software program suitable for each of the structural elements. Each of the structural elements may be caused to function by a program running unit, such as a CPU or a processor, reading and running a software program stored in a recording medium, such as a hard disk or semiconductor memory. Here, the program described herein is software for implementing the information processing method in each of Embodiments 1 to 3 or software for use in the information processing system in each of Embodiments 1 to 3.

That is, a computer is caused to run the program and, thus, implements the information processing method that includes: obtaining a plan including at least locations to which a moving object is expected to travel and stay at; setting, on the basis of the locations included in the plan, a candidate charging location at which the battery of the moving object is chargeable; obtaining the reservation status of a charging station associated with the candidate charging location; and arranging reservation details according to the reservation status of the charging station.

The information processing method(s) and the information processing system(s) according to one or more than one embodiment of the present disclosure are described on the basis of the embodiments. However, the above embodiments are not intended to limit the present disclosure. Without departing from the spirit of the present disclosure, the present disclosure may include an embodiment created by making various changes envisioned by those skilled in the art to the above embodiments or an embodiment created by combining structural elements described in different embodiments.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure provides useful techniques such as an information processing method and an information processing system with which it is possible to improve the efficiency of use of a moving object with a battery.

What is claimed is:

1. An information processing method implemented by a computer, the information processing method comprising:
    obtaining a delivery plan including at least locations to which a moving object is expected to travel and stay at, each of the locations being a location for a user of the moving object to perform a task at the location, the task being part of one or more tasks in the delivery plan;
    setting, based on the locations included in the delivery plan, a candidate charging location at which a battery of the moving object is chargeable;
    obtaining a reservation status of a charging station associated with the candidate charging location;
    arranging reservation details according to the reservation status of the charging station;
    automatically transmitting the reservation details to a charging station management server of the charging station associated with the candidate charging location, and receiving acceptance of a reservation from the management server; and
    after receiving the acceptance of the reservation, displaying the reservation details to an operation terminal of the user of the moving object, wherein the setting of the candidate charging location includes selecting the candidate charging location from among the locations included in the delivery plan, the delivery plan includes an expected stay time of the moving object at each of the locations included in the delivery plan, the expected stay time for each of the locations being determined according to necessary time for the user to perform the task at the location, the task being part of the one or more tasks in the delivery plan, and in the selecting, a location at which an expected stay time of the moving object at the location is longer than a predetermined threshold is selected as the candidate charging location from among the locations included in the delivery plan.

2. The information processing method according to claim 1, wherein in the obtaining of the delivery plan, the delivery plan is received from a scheduling server, and in the obtaining of the reservation status, the reservation status is received from the charging station management server.

3. The information processing method according to claim 1, wherein in the selecting, a candidate charging location is selected to enable a remaining charge in the battery to change between an upper limit and a lower limit of a charging capacity.

4. The information processing method according to claim 2, further comprising:

making a first determination for determining whether it is possible to reserve the charging station from the reservation status;

changing the delivery plan when a result of the first determination shows that it is not possible to reserve the charging station;

making a second determination for determining whether it is possible to reserve a charging station associated with a candidate charging location set based on the delivery plan that has been changed; and transmitting the delivery plan that has been changed to the scheduling server when a result of the second determination shows that it is possible to reserve the charging station set after the changing.

5. The information processing method according to claim 4, further comprising:

in the changing, rearranging the locations included in the delivery plan;

in the second determination, determining whether it is possible to reserve a charging station associated with a candidate charging location set based on the locations rearranged in the changing; and transmitting, to the scheduling server, the delivery plan changed by rearranging the locations and including at least the locations rearranged, the transmitting being performed when the result of the second determination shows that it is possible to reserve the charging station set after the rearranging.

6. The information processing method according to claim 4, wherein in the changing, a change is made to a stay time in at least one of the locations included in the delivery plan.

7. The information processing method according to claim 2, further comprising:

creating authentication information for use in authentication of the reservation details between the charging station and the moving object; and transmitting the authentication information to the charging station management server and a terminal of a user of the moving object.

8. The information processing method according to claim 2, further comprising:

receiving, from the charging station management server, charging history information indicating a history of charging of the moving object at the charging station;

deriving a result of usage of the charging station from the charging history information; and transmitting the result of the usage to a terminal of a user of the moving object.

9. The information processing method according to claim 8, further comprising:

setting a benefit to be granted to an administrator of the charging station, based on the charging history information; and transmitting information on the benefit to the charging station management server or a terminal of the administrator.

10. The information processing method according to claim 1, wherein the part of the one or more tasks includes at least one of delivery, collection, loading, unloading, resting, inspection, and waiting for unloading.

11. An information processing system, comprising:

a processor; and a non-transitory memory having stored thereon executable instructions, which cause the processor to perform:

obtaining a delivery plan including at least locations to which a moving object is expected to travel and stay at, each of the locations being a location for a user of the moving object to perform a task at the location, the task being part of one or more tasks in the delivery plan;

setting, based on the locations included in the delivery plan, a candidate charging location at which a battery of the moving object is chargeable;

obtaining a reservation status of a charging station associated with the candidate charging location;

arranging reservation details according to the reservation status of the charging station; automatically transmitting the reservation details to a charging station management server of the charging station associated with the candidate charging location, and receiving acceptance of a reservation from the management server; and after receiving the acceptance of the reservation, displaying the reservation details to an operation terminal of the user of the moving object, wherein the setting of the candidate charging location includes selecting the candidate charging location from among the locations included in the delivery plan, the delivery plan includes an expected stay time of the moving object at each of the locations included in the delivery plan, the expected stay time for each of the locations being determined according to necessary time for the user to perform the task at the location, the task being part of the one or more tasks in the delivery plan, and in the selecting, a location at which an expected stay time of the moving object at the location is longer than a predetermined threshold is selected as the candidate charging location from among the locations included in the delivery plan.

* * * * *